Jan. 10, 1933.　　　J. P. BUCKLEY　　　1,894,019
AIRCRAFT SIGNALING
Filed Aug. 6, 1929　　　2 Sheets-Sheet 1

John P. Buckley
Inventor

Jan. 10, 1933.   J. P. BUCKLEY   1,894,019
AIRCRAFT SIGNALING
Filed Aug. 6, 1929   2 Sheets-Sheet 2
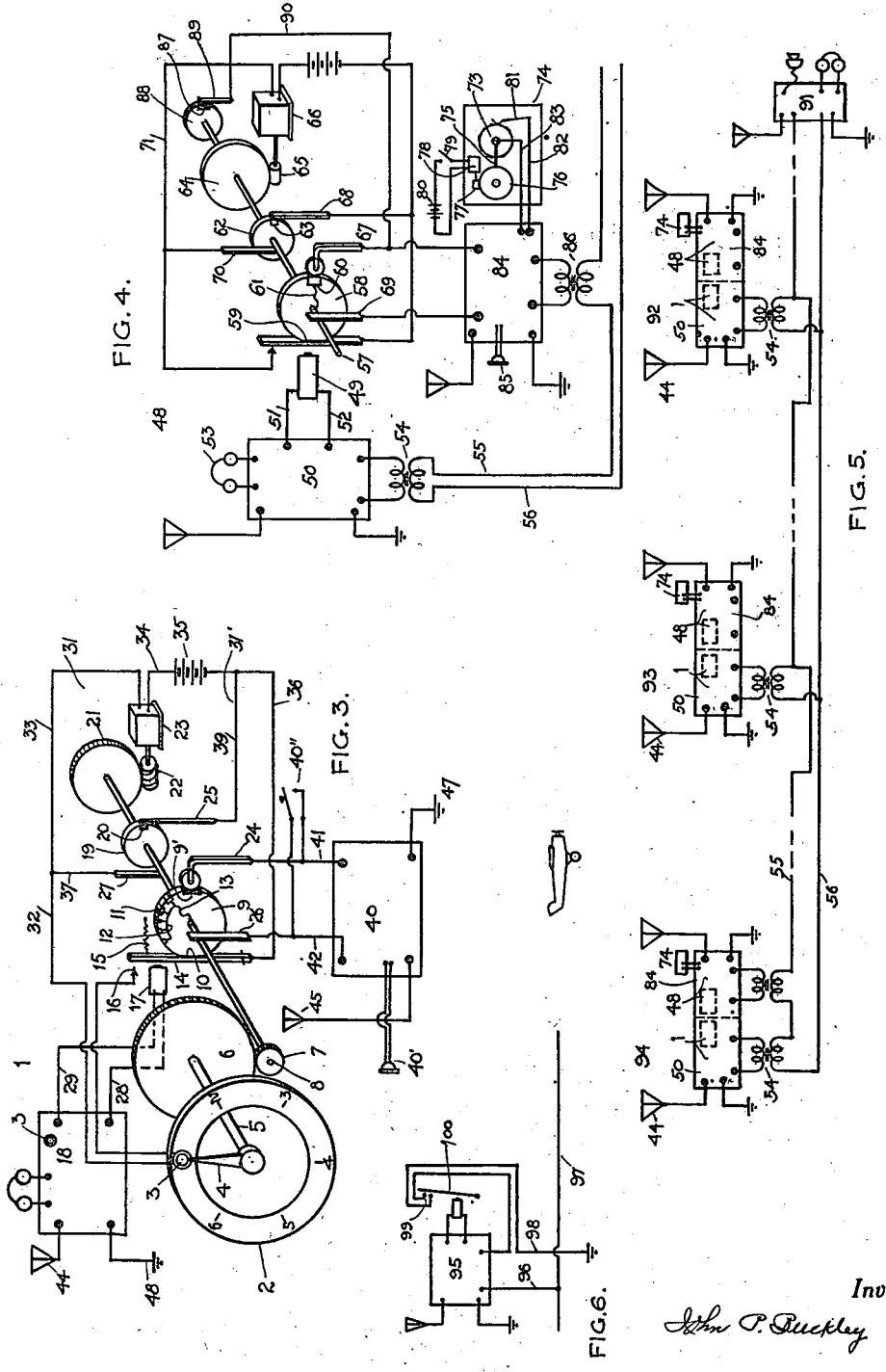
Inventor
John P. Buckley Patented Jan. 10, 1933

1,894,019

UNITED STATES PATENT OFFICE

JOHN P. BUCKLEY, OF WASHINGTON, DISTRICT OF COLUMBIA

AIRCRAFT SIGNALING

Application filed August 6, 1929. Serial No. 383,854.

This invention relates to aircraft signaling such as might be practiced along airways, more particularly where marker beacons are employed to indicate a true course, and has for its object a means for intercepting the radiant energy of such beacons and actuating a signal lamp on an aircraft for recording the passage of the aircraft through predetermined zones of electrical energy.

Another object of my invention is to provide a transmitting set for aircraft with signaling means whereby a beacon receiving set may be energized to transmit a signal or message over a wire to the home office.

Still another object is to provide means for long distance communication with low-power signaling apparatus.

A further object is to create a block or zone system for aircraft guiding as will be hereinafter described.

Other and further objects of my invention will be understood from the specification hereinafter following by reference to the accompanying drawings wherein Fig. 1 is a front elevation of the beacon visual indicator and its members for actuating the transmitter.

Fig. 3 is a schematic arrangement of the wiring diagram, beacon visual indicator and its various parts.

Fig. 4 is a schematic arrangement of the wiring diagram of the beacon's receiving and transmitting sets, and the automatic means for operating the same.

Fig. 5 designates a plan view of the home office set and the beacon's stations along the way.

Fig. 6 shows how the receiving set may be attached to a telegraph wire and the automatic means for completing the ground connection.

Figure 2:
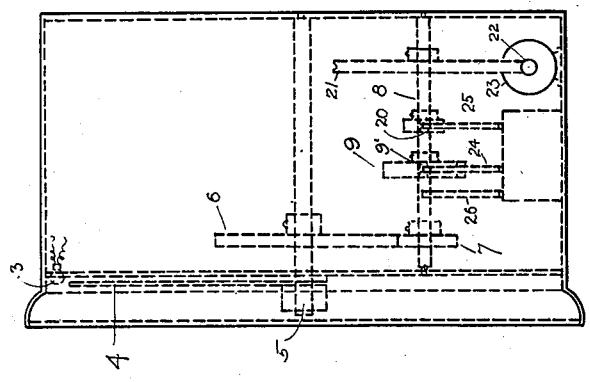
Fig. 2 is a side view of the same.
Figure 1:
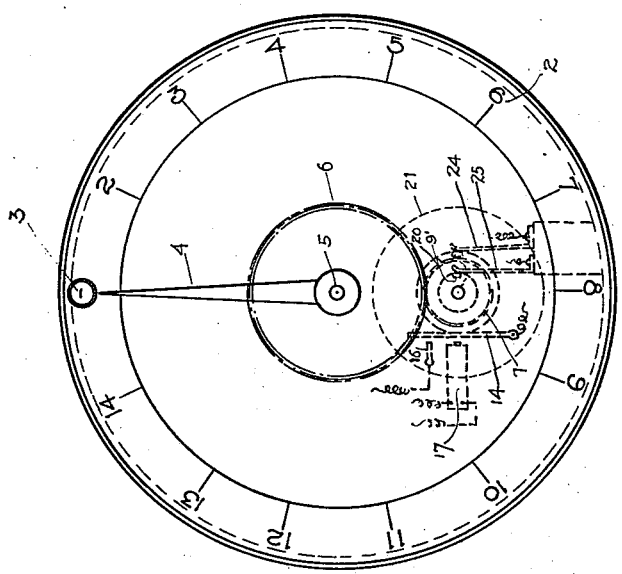

Referring to Fig. 3, numeral 1 designates the receiving and transmitting sets in an aircraft, the receiving set showing a dial with scale 2 shown in Figs. 1 and 2 on its outer edge.

The signaling lamp 3 is disposed in the upper portion of the center of the scale illustrated in Fig. 1. The hand 4, identifying the scale, is mounted on the shaft 5, upon which is also mounted the gear 6. Meshing with the gear is pinion 7, fast on shaft 8, which also supports the disc 9, having a cut away portion 10.

The code key 11 electrically connects with the shaft by wires 12 and 13. Normally resting against the cut-away portion 10 of the disc is armature 14, held in such manner by spring 15, the upper portion of the armature electrically contacts with the fixed contact point 16, when the relay magnet 17 becomes energized by the receiving set 18. The metallic disc 19 carries the insulation block 20, and near the end of the shaft is the fixed gear 21, which gear is engaged by the worm 22 of the motor 23.

The brushes 24 and 25 electrically contact with their respective discs, while the brushes 26 and 27 are electrically grounded to the shaft, as shown.

Referring to the circuit diagram, the receiving set 18 may be of any suitable character or design capable of operating a relay, shown in this case as connected by leads 28 and 29 of the receiving set.

Operably associated with the relay and serving as a part of the normally open circuit 31, is the armature 14, which, in functioning, forms an electrical contact with the fixed contact point 16. This action causes the circuit 31 to close, involving the said fixed contact, wires 32 and 33, motor 23, wire 34, battery power 35, and wire 36.

The auxiliary circuit 31' is formed by the brush 27, wires 37 and 33, motor 23, wire 34, batteries 35, wires 36 and 39, brush 25 and through metallic disc 19.

Leading from brush 24 and connecting the transmitter 40, are wires 41 and 42, the return wire 42 of the transmitter leads to and connects with the grounded brush 26. The transmitter is provided with the microphone 40' and key 40''.

The antennæ 44 and 45, and the ground connections 46 and 47 connected with their respective sets are cared for in the usual way.

The numeral 48 designates the receiving and transmitting set of the beacon. 49 represents the relay of the receiving set 50, connected thereto as by wires 51 and 52. The receiving set is also provided with telephone receivers 53 and a transformer 54, to which is attached the wires 55 and 56 as might lead to a remote station. 57 is a shaft supporting the insulation disc 58, having a cut-off 59, and the metallic block 60, electrically connected to the shaft by wire 61. The metallic disc 62, fixed on the shaft has an insulation block 63.

The gear 64, also fixed on the shaft, meshes with worm gear 65 of the motor 66. The brushes 67 and 68 connect with the two discs 58 and 62. The brushes 69 and 70 are grounded to the shaft 57.

The circuit 71 is of similar design as circuit 31, Fig. 3. The circuit 72 is the same as circuit 31', Fig. 3. The brushes 67 and 69, contacting with disc 58, through the transmitting circuit, control the code disc 73, shown in case 74, supported by shaft 75, on which also is gear 76, in mesh with the worm 77 and made to operate by motor 78. The switch 79 normally closed and the source 80, complete the motor circuit.

The code disc is provided with the brush 81, connecting wire 82, while wire 83 is shown as being grounded to the shaft; both wires are connected to the binding posts of the transmitter 84. Associated with the transmitter are the microphone 85 and transformer 86, connecting as shown, to the wires 55 and 56.

Supported on the end of the shaft 57 and having an insulation block 87 is the danger signal disc 88 electrically grounded to the shaft and having a brush 89 and wire 90 leading to the transmitter.

With reference to Fig. 5, the central office is provided with a receiving and transmitting set 91, which may be of similar design shown in Fig. 4, and leading therefrom are the long transmission cables 55 and 56, along which length are the several marker beacons 92, 93 and 94 along the system. Each of the marker beacons, while connected to the wire 55 and 56, are directly wired to the home station, this is accomplished by connecting the wire 55 to one side of the transformer only, as shown.

I do not confine myself to the use of two wires for connecting the marker beacons with the home office, as the same results may be brought about by radiant means, or one wire may apply, as shown in Fig. 6, which shows the radio receiving set 95, the wire 96, connecting the receiver to the telegraph wire 97, and the broken ground lead 98, which is electrically completed at point 99, when the armature 100 is attracted.

Many radio beacons are now being installed along airways for the purpose of providing an air course over which an aircraft might fly.

These radio beacons are placed two hundred miles apart. To render the system more effective as well as to indicate emergency landing fields, marker beacons are placed at every twenty-five miles apart along the system. These marker beacons are under the supervision of one or more attendants, their reliability equaling only the amount of attention usually given by the human element in such cases.

To simplify the practice and to obviate the expense of such attendance, to assure a more reliable system between the pilot and beacon, and to provide a low-power transmission, together with providing a danger signal when an aircraft has entered a zone, is the purpose of the invention. I accomplish this in the following manner:

The marker beacons are provided with the automatic means as shown more particularly in Figs. 4 and 5, of the drawings, and are electrically linked together by two wires leading from the transmitting and receiving sets in the home station.

For obvious reasons, I prefer to show the metallic cable or wires, to which are attached a series of transformers connecting the receivers of the marker beacons, the whole being connected and inductively designed to make each marker beacon successively independent of the other where the cable will offer the least amount of resistance for the transmission of code or speech.

In practice, a receiving and transmitting set which may be of two different frequencies is carried by the aircraft. On approaching the beacon zone the receiving set, which is normally on, becomes sensitized, causing the signal lamp to flash and the relay to energize the circuit 31, controlling the motor 23. This action releases the brushes from their insulation blocks 9' and 20, at which time the control mechanism becomes independent of the relay, the greater radius of the disc 9, holding the armature fast to the contact point 16, while the disc 19, functions to the same end in shorting the circuit 31. For a portion of the revolution the aircraft's signal 11, is automatically dispatched, which radiation, in turn, sensitizes the relay 49 of the beacon's receiving set 50, causing at the same time the circuit 71 to close, and the aircraft's signal to pass on through the transformer to the home office.

The drawing shows the insulation disc 58 carrying a metal block 60, as grounded to the shaft, this application would automatically hold the transmitter on when the control mechanism was at rest, as shown, and off when the mechanism was influenced by the passage of an aircraft. During such silent period of the beacon's signal, the danger signal disc 88, makes contact with the brush 89, and through the wire 90, and the grounded shaft 57, completes a circuit through the transmitter for broadcasting the said danger signal as would indicate an aircraft occupying that particular block or zone, coming within the zone all aircrafts going south would immediately fall to one thousand feet; all aircrafts going north would immediately rise to two thousand feet. East and west flying might have other levels.

This application is particularly favorable for night, storm, and fog flying. During the passage of the aircraft over the zone, the aviator may talk or code his message to the home office. He may either be talked to through a broadcast or through means of the wires 55 and 56, inductively connecting the transmitter by transformer 55', shown in Fig. 5 to marker beacon station 94. With each crossing of the zones the controlling mechanism of the aircraft completes one revolution, thus while automatically changing the switches, tallies one number preceding the one flying through. Having thus described the invention, I claim:

1. Aircraft signaling system comprising a plurality of radio transmitting sets constituting a system of predetermined spaced radio beacon stations, each of said radio transmitting sets being adapted to transmit radiant energy over a predetermined range, means carried by an aircraft for receiving and converting such radiant energy into signaling form, a transmitting set carried by the aircraft and operably associated with the receiving means on the aircraft, means for automatically actuating the transmitting set on the aircraft under control of the energy received by the receiving set on the aircraft, and signal receiving means at each of said first mentioned radio transmitting sets for receiving the energy transmitted by the transmitting set on the aircraft for correspondingly controlling the transmitting set at each beacon station.

2. Aircraft signaling means comprising a multiplicity of beacon stations, means for transmitting and receiving radiant energy at each beacon station, receiving and transmitting means carried by an aircraft, means for electrically transmitting signals from the transmitting means of the beacon to the receiving means of the aircraft, means for automatically actuating the transmitting means on the aircraft under control of the receiving means thereon, for transmitting signals from the aircraft to the receiving means of the beacon, a remote station, and means interconnecting the receiving means of each beacon station with said remote station.

3. Aircraft signaling means comprising a beacon station having a transmitting and receiving apparatus, means on aircraft for transmitting radiant energy, a receiving set on the aircraft operably associated with said transmitter, mechanism including a rotatable shaft, circuit breaking means operated thereby, tripping means for causing the said shaft to actuate said circuit breaking means and perform one complete revolution, a relay controlled by said receiving set and adapted to be energized and deenergized according to the signals transmitted from the beacon station for controlling the rotation of said shaft and the operation of the circuit breaking means, a remote station, and means for electrically interconnecting the receiving apparatus at each beacon station with said remote station, whereby receiving and transmission from an aircraft to said remote station may be established.

4. Aircraft signaling system comprising an aircraft transmitter and receiver, means for automatically controlling said transmitter when said receiver is excited by energy from a radio beacon, a rotatable shaft, a motor for operating said shaft, a relay actuated by said receiver, arresting means for preventing the transmission of signals from said transmitter when said receiver is not excited by signaling energy, and reception and transmitting means remote from the aircraft and means for conveying the resultant energy to a remote point with respect to said last mentioned means.

5. A system of aircraft navigation comprising a multiplicity of geographically spaced radio beacon stations, each of said beacon stations including a transmitter and receiver, a remote control station, line wires interconnecting said remote control station with each of said beacon stations, aircraft transmitting and receiving apparatus, said receiving apparatus being maintained in a condition continuously responsive to signals from any one of said beacon transmitters, the transmitting means on the aircraft being operative to transmit signaling energy and being operative under control of signaling energy incident upon the receiving apparatus on the aircraft for the transmission of predetermined signals to the receiver at one of said beacon stations for registering at said remote control station the location of the aircraft in said respective zones.

6. Signaling apparatus for aircraft comprising a receiving circuit on aircraft continuously responsive for the reception of signaling energy, a transmitting circuit on aircraft adapted to transmit signaling energy from the aircraft, a plurality of coacting receiving and transmitting stations disposed at spaced geographical positions on the ground along the line of flight, each receiving station being responsive to the transmitted signaling energy from the aircraft for correspondingly controlling the transmission of signals from the coacting transmitting station to the receiving circuit on the aircraft, means on the aircraft interlinking the receiving apparatus with the transmitting apparatus on the aircraft for rendering said transmitting apparatus operative for the transmission of communication signals in the absence of signaling energy incident upon said receiving apparatus from the coacting transmitting station on the ground, for actuating the transmitter on the aircraft for the transmission of predetermined signals when signaling energy is being received from the coacting transmitting station on the ground by the receiving apparatus on the aircraft.

7. Signaling apparatus for aircraft comprising a transmitting and receiving apparatus, means for automatically transmitting predetermined signals from said transmitting apparatus, and circuits interconnecting said means with said receiving apparatus for preconditioning said transmitting apparatus for the transmission of signals during the periods that signaling energy is incident upon said receiving apparatus.

8. Aircraft signaling apparatus comprising a transmitting and receiving apparatus mounted upon aircraft, a plurality of coacting transmitting and receiving stations located on the ground in spaced geographical positions along the line of flight, mechanism for controlling the automatic transmission of signals from the transmitting apparatus on the aircraft, circuits for controlling the manual transmission of signals from the transmitting apparatus on the aircraft, and means operative when the receiving apparatus is activated by incoming signaling energy from a coacting transmitting station on the ground for rendering said transmitting apparatus on the aircraft operative for the periodic transmission of predetermined signaling characters from the aircraft.

9. Aircraft signaling apparatus comprising transmitting and receiving apparatus adapted to be mounted in aircraft, circuits for controlling the transmission of signals from said transmitting apparatus, an independent circuit for controlling the transmission of predetermined signaling characters from said transmitting apparatus, and means operative under control of said receiving apparatus when said receiving apparatus is activated by incoming signaling means for rendering said independent circuit operative to control the automatic transmission of predetermined signals from said transmitting apparatus.

10. In a system of aircraft navigation, a multiplicity of geographically separated beacon stations each including transmission and receiving apparatus, aircraft carrying radio transmission and receiving apparatus thereon, automatic means interposed between the circuits of said transmission and receiving apparatus for predetermining the operation of the transmission apparatus according to the time periods that the receiving apparatus is activated by energy transmitted from said beacon transmitter to the aircraft receiver, and means for coordinating the operation of all of said beacon stations for communicating with and determining the location of aircraft from a point remote to all of said beacon stations.

11. In a system of aircraft navigation, a multiplicity of beacon stations disposed in separated zones, each of said beacon stations including a transmitting and receiving apparatus, a remote control station interconnecting the beacon stations of all of said zones, signaling apparatus adapted to be carried by aircraft, said apparatus including a transmitter and a receiver, said receiver being continuously maintained in a condition responsive to the receipt of signaling energy from each of said beacon stations during the course of flight of the aircraft over said zones, and means controlled by the receiving apparatus on the aircraft when activated by a signaling energy transmitted from a beacon station in a given zone for controlling the automatic transmission of signals from the transmitting apparatus on the aircraft to the beacon station, for indicating at said remote station the location of the aircraft with respect to said zones.

12. In a system of aircraft navigation, a multiplicity of geographically spaced zones each including a beacon station comprising a radio transmitter and receiver, a remote station, a line circuit interconnecting said remote station with the transmitting and receiving apparatus at said beacon stations, apparatus carried by aircraft including transmitting and receiving apparatus, said receiving apparatus being maintained in a condition continuously responsive to the reception of signaling energy from the beacon transmitter, a relay connected with said receiving apparatus, a driving motor controllable by said relay, a contact system operative by said motor, and means controlled by said relay upon the receipt of signals by said receiving apparatus for controlling the automatic transmission of signals from said transmitting apparatus for reception at said beacon stations for indicating at said remote station the relative position of the aircraft with respect to said zones.

13. A system of aircraft navigation comprising a plurality of beacon stations disposed in spaced zones, each beacon station including a transmitter and receiver, a remote control station, a line wire circuit interconnecting the apparatus at said beacon stations with said remote control station, the transmitting apparatus and each beacon station having a transmitting range limited within the zone occupied by said beacon station, radio transmitting and receiving apparatus adapted to be carried upon aircraft, the receiving apparatus being maintained in a condition continuously responsive under signaling energy within the range of said beacon stations, and selector means rendered operative by signaling energy incident upon the receiving apparatus on aircraft for preconditioning the transmitting apparatus on the aircraft for radiating signaling energy according to predetermined signaling characters for reception by the receiving apparatus of a beacon station, whereby the relative location of the aircraft with respect to said zones may be determined from said remote control station.

14. A system of aircraft navigation comprising a multiplicity of beacon stations disposed in geographically separated zones, transmitting and receiving apparatus located in each of said beacon stations, a remote control station, a line wire circuit interconnecting said beacon stations with said remote control station, apparatus on aircraft including a radio transmitter and a radio receiver, and means disposed between the transmitting and receiving apparatus at said beacon stations and on the aircraft for preconditioning the operation of said transmitting apparatus according to the operation by the receiving apparatus, whereby the location of aircraft with respect to said zones may be determined.

In testimony whereof he affixes his signature.

JOHN P. BUCKLEY.